Figure 1:
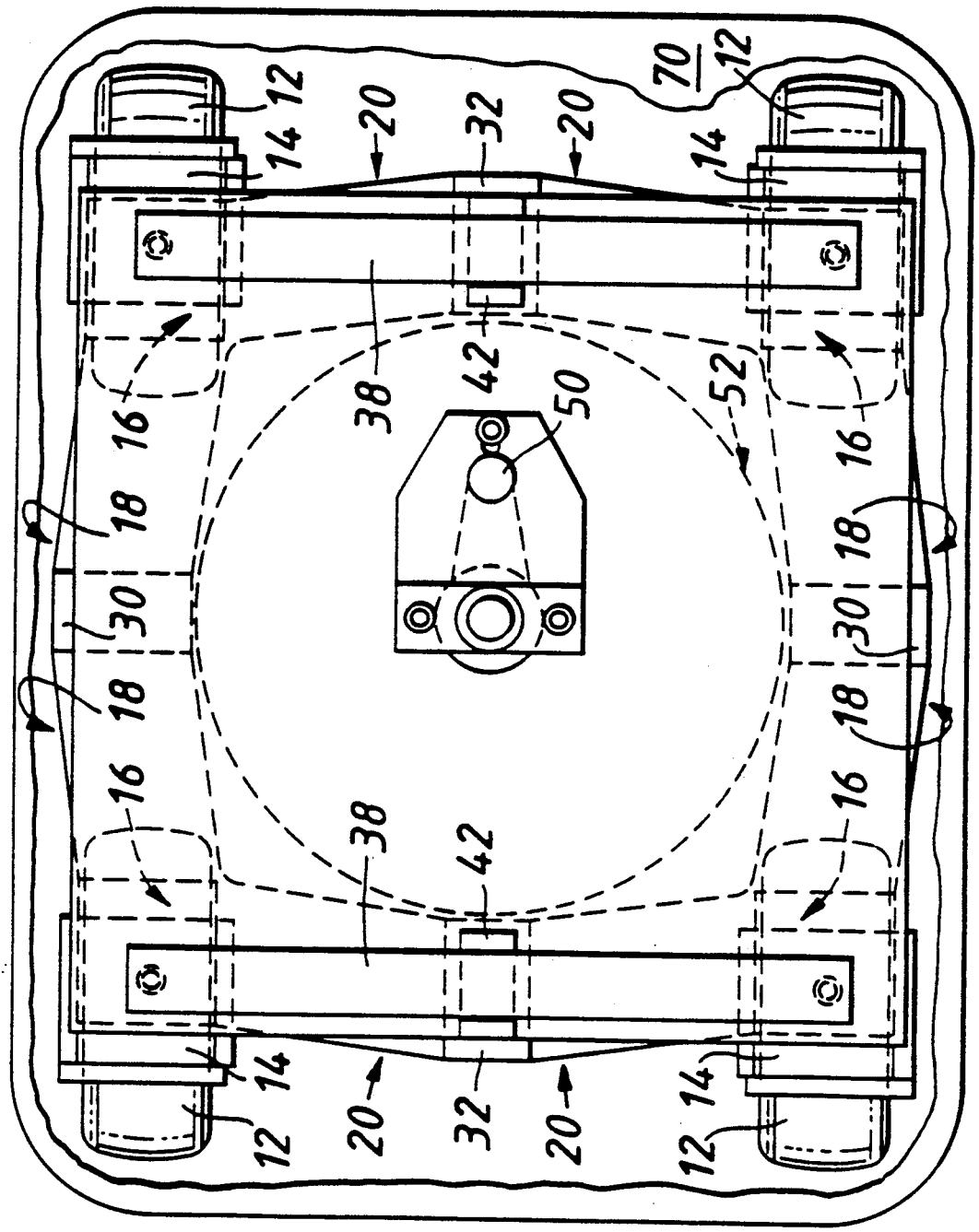

United States Patent [19]

Ashworth

[11] Patent Number: 5,080,390
[45] Date of Patent: Jan. 14, 1992

[54] VEHICLE WITH PLASTIC SUSPENSION

[75] Inventor: Roger P. Ashworth, Forest Hall, United Kingdom

[73] Assignee: British Gas plc, England

[21] Appl. No.: 603,669

[22] PCT Filed: Mar. 9, 1990

[86] PCT No.: PCT/GB90/00358
§ 371 Date: Nov. 2, 1990
§ 102(e) Date: Nov. 2, 1990

[87] PCT Pub. No.: WO90/11199
PCT Pub. Date: Oct. 4, 1990

[30] Foreign Application Priority Data

Mar. 29, 1989 [GB] United Kingdom ............... 8907090

[51] Int. Cl.$^5$ ................................................ B60G 3/00
[52] U.S. Cl. .................................... 280/699; 280/718; 280/719
[58] Field of Search ............... 280/719, 718, 699, 688; 180/167, 169

[56] References Cited

U.S. PATENT DOCUMENTS

| | | | |
|---|---|---|---|
| 1,209,205 | 12/1916 | Ridgway | 280/719 |
| 4,055,362 | 10/1977 | Becker, III | 293/62 |
| 4,620,285 | 10/1986 | Perdue | 180/167 |
| 4,690,427 | 9/1987 | Raidel, Sr. | 280/699 |
| 4,749,206 | 6/1988 | Delery et al. | 280/699 |

FOREIGN PATENT DOCUMENTS

| | | | |
|---|---|---|---|
| 0238426 | 9/1987 | European Pat. Off. | 280/719 |
| 0349110 | 5/1989 | European Pat. Off. | |
| 808917 | 7/1951 | Fed. Rep. of Germany | |
| 3004158 | 8/1981 | Fed. Rep. of Germany | |
| 949761 | 9/1949 | France | |
| 1190149 | 10/1959 | France | |
| 2528364 | 12/1983 | France | |
| 2552718 | 4/1985 | France | |
| 2586624 | 3/1987 | France | 280/719 |
| 796151 | 6/1958 | United Kingdom | |
| 1092120 | 11/1967 | United Kingdom | |
| 1144800 | 3/1969 | United Kingdom | |
| 89/07775 | 8/1989 | World Int. Prop. O. | |

*Primary Examiner*—Kenneth R. Rice
*Attorney, Agent, or Firm*—Larson and Taylor

[57] ABSTRACT

Four wheeled vehicle supporting a ground probing radar antenna 52 has an aluminium alloy square plate 10 and four wheel mountings 14 supported by four pairs of equal-length arms 18,20. The arms as seen in plan are arranged in a square. One arm 18 in any pair extends lengthwise of the vehicle from an anchorage 30 on the vehicle to a mounting 14 and the other 20 extends transversely of the vehicle from an anchorage 32 on the vehicle to the mounting 14. Each mounting carries a buffer 36 which on upward movement presses against one of two spring arms 38 carried by mountings 42, one arm being locked in its mounting. The vehicle has an overcover 70 and an undercover 72. In a modification pneumatic spring units instead of arms 38 control vertical wheel motion.

8 Claims, 3 Drawing Sheets

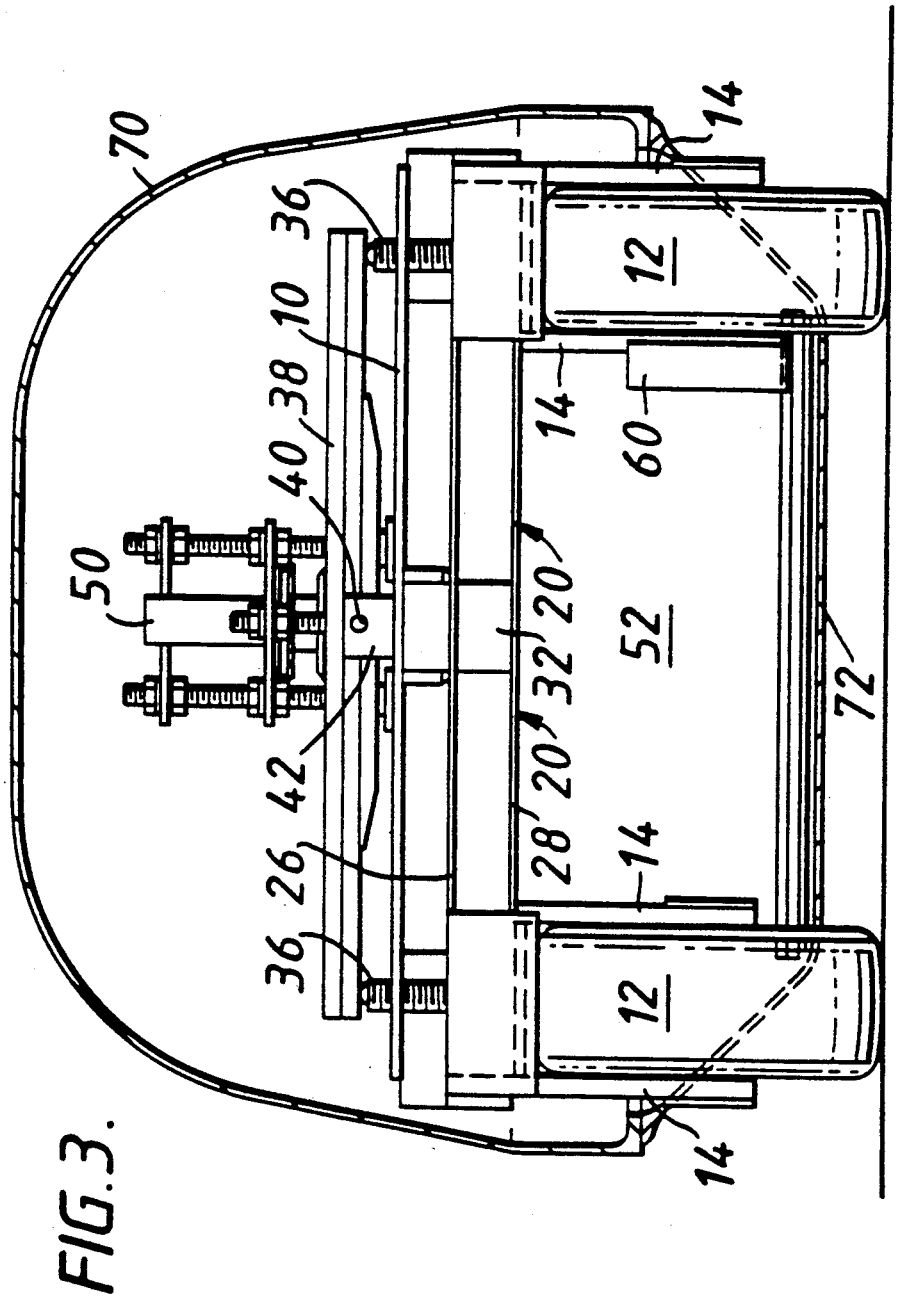

VEHICLE WITH PLASTIC SUSPENSION

The invention relates to vehicles with plastic suspensions.

The vehicle is particularly, though not exclusively, suited for use as a means of supporting a ground probing radar assembly. Such an assembly has a square metal plate above the antenna which produces a large amount of radio frequency shielding of the metal work of the electronics units mounted above the plate. In order to reduce spurious reflections off objects placed near to the antenna, such as the vehicle suspension, it is necessary to use 4-fold symmetry as far as possible.

A vehicle according to the invention has four wheels of plastics material with a suspension of plastics material comprising four wheel mountings and four pairs of equal length arms, one pair for each mounting, the four pairs as seen in plan being arranged in a square, one arm in any pair extending lengthwise of the vehicle from an anchorage on the vehicle to the mounting and the other extending transversely of the vehicle from an anchorage on the vehicle to the mounting, the suspension also comprising means controlling vertical wheel motion.

In one form of vehicle, said means comprises a buffer carried by each mounting which on upward movement pushes against an abutment.

Preferably, the abutment is one end portion of an arm mounted mid-way between two leading or trailing wheels so that the two buffers carried by the mountings of those wheels push against abutments on the same arm. Preferably, each pair of leading or trailing wheels has an arm mounted mid-way between the wheels of the pair.

Figure 2:
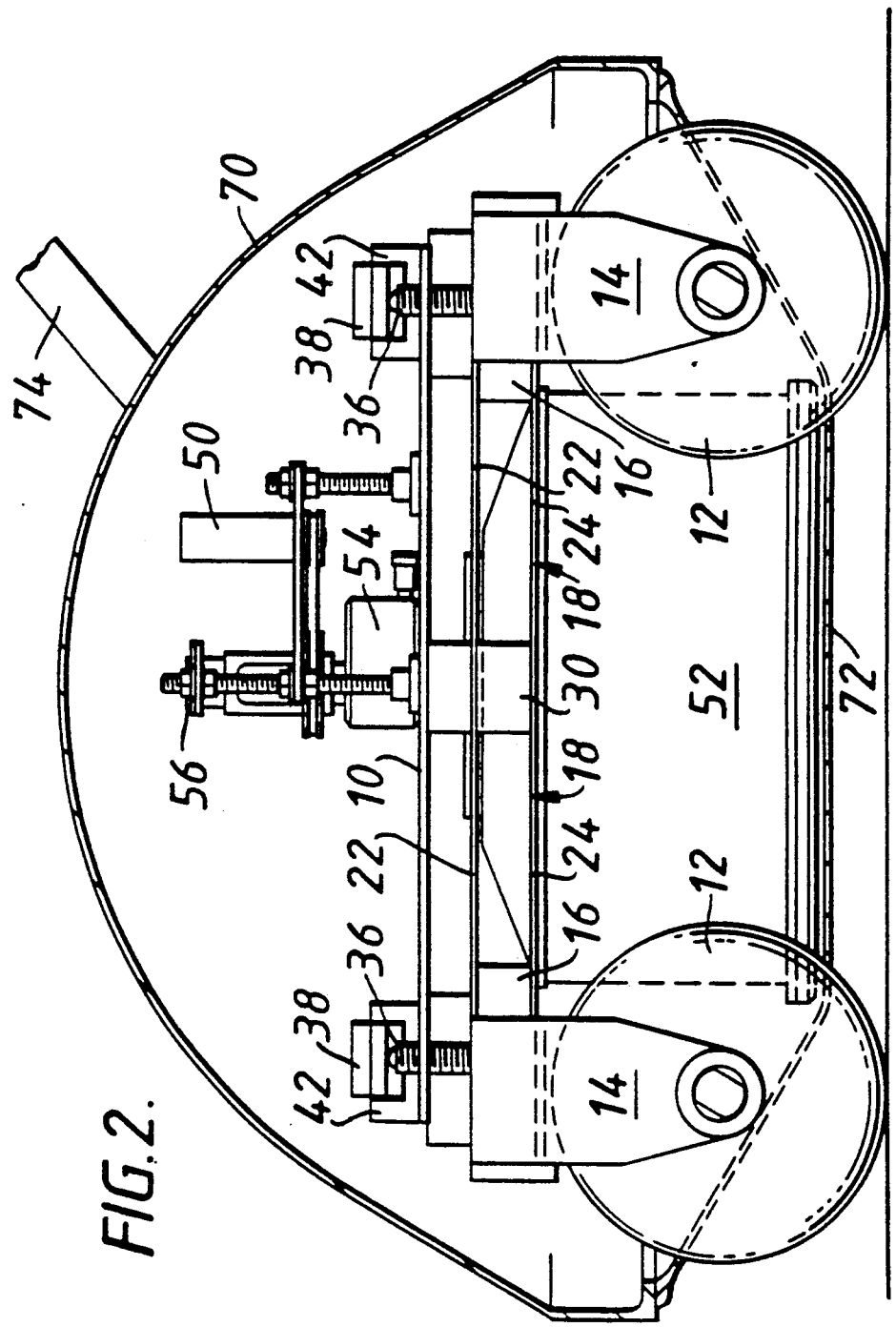

One embodiment of vehicle will now be described by way of example with reference to the accompanying drawings in which;

FIGS. 1, 2 and 3 are, respectively, a plan, a side elevation and an end elevation, partly in section of the vehicle.

The drawings show a vehicle having a chassis 10 in the form of a square 6 millimeter thick aluminum alloy plate. The square is 60 centimeters by 60 centimeters and is supported on four ground wheels 12 of synthetic plastics materials. The wheels 12 are each mounted in a mounting 14 secured to a block 16. Each block 16 is secured to a pair of equal length arms 18, 20 which, as seen in plan, are arranged in a square as shown in FIG. 1. The arms 18, 20 as shown are slightly angled but they could equally well conform exactly to the sides of a square. The mountings 14 are positioned so that the wheels 12 are at the corners of a rectangle, as shown.

Each arm 18, 20 consists of two spring leaves 22, 24 and 26, 28 arranged one above the other. Each arm 18 extends lengthwise of the vehicle from an anchorage 30, secured mid-way along one side of the chassis plate 10, to the relevant mounting block 16. Each arm 20 extends transversely of the vehicle from an anchorage 32, secured mid-way along one end of the chassis plate 10, to the relevant mounting block 16. The spring leaves 22, 24 and 26, 28 are each integral with the mounting 16 and either the anchorage 30 or 32.

Each mounting block 16 carries an upright buffer 36 which extends through a hole in the plate 10. The two buffers 36 on the mounting block 16 at one end of the vehicle (FIG. 3) on upward movement press against an abutment in the form of end portions of a multi-leaf spring arm 38. The arm 38 is pivoted about a horizontal pivot pin 40 secured in a mounting 42. The buffers 36 at the other end of the vehicle are similar and on upward movement press against an abutment in the form of end-portions of a multi-leaf spring arm 38, in this case locked against pivotal movement about its pin 40.

The arms 18, 20 kinematically locate each wheel mounting 14 with respect to the chassis 10 so that the wheel mounting can move approximately vertically. They are similar to pin-jointed, rigid arms which in a modification is used instead.

The stiffness in the suspension is provided by the spring arms 38. By locking one arm 38 against motion about its pivot pin 42, it is ensured that all four wheels 12 engage the ground. In a modification both arms 38 are locked against motion, so providing independent four wheel suspension. The arms could be quite rigid, avoiding spring action altogether.

In another modification, pneumatic spring units are used instead of the spring arms 38. The pressure in the units can be adjusted, for example, to change the height of "ride" of the suspension.

The chassis plate 10 carries a drive motor 50 for driving the antenna assembly 52 of a ground probing radar mounted beneath the mid-point of the chassis plate 10. The antenna assembly 52 has a cylindrical outer shape. Also mounted on top of the chassis plate 10 is an encoder 54 driven by the rotation of the antenna assembly 52 and a two-channel rotating microwave connector assembly 56.

Further particulars of the ground-probing radar can be obtained from our co-pending British patent application No. 8812705.

One wheel 12 (FIG. 3) drives an encoder 60 which includes a toothed wheel driven by the ground wheel 12 and which interupts a light beam to count revolutions of the ground wheel 12.

The vehicle has an overcover 70 and an undercover 72, the latter to prevent damage to the antenna assembly 52. The vehicle can be driven by means of a handle 74 which is arranged to be swung over the vehicle from one position (shown) to the opposite position to enable the vehicle to be driven in either direction.

The suspension comprising the wheel mountings 14, the blocks 16, the arms 18, 20, the buffers 36 and the anchorages 30 and 32 are made from synthetic plastics material, as are the spring arms 38 and mounting 42 and the overcover 70 and undercover 72. The construction beneath the plate 10 is virtually wholly synthetic plastic material.

It may be necessary to place the wheel mountings other than at the corners of the square formed by the pairs of equal length arms. The exact positions are found by experiment so as to give a symmetrical position from a radar point of view. The exact positions of the wheel mountings are quite close to, if not in conformity with, the positions at the corners of the square.

I claim:

1. A vehicle with four wheels of plastic material with a suspension of plastic material, comprising four wheel mountings and four pairs of equal length arms, one pair for each mounting, the four pairs as seen in plan being arranged in a square, one arm in any pair extending lengthwise of the vehicle from an anchorage on the vehicle to the mounting and the other extending transversely of the vehicle from an anchorage on the vehicle to the mounting, each arm comprising two leaves arranged in respective horizontal planes, each leaf having a first and second end, the first end being connected to one of said anchorages so that the only motion of said leaf relative to said anchorage is an oscillating motion in a vertical plane, and said second end being connected to one of said wheel mountings so that the only motion of said leaf relative to said wheel mounting is an oscillating motion in a vertical plane, and there being no motion of any arm transmitted to said respective wheel through said anchorage, and the suspension also comprising means for controlling vertical wheel motion.

2. A vehicle according to claim 1, said means comprising a buffer carried by each mounting which on upward movement pushes against an abutment.

3. A vehicle according to claim 2, the abutment being one end portion of an arm mounted mid-way between two adjacent wheels so that the two buffers carried by the mountings of those wheels push against abutments on the same arm.

4. A vehicle according to claim 3, each pair of adjacent wheels having an arm mounted mid-way between the wheels of the pair.

5. A vehicle according to claim 2 the abutment being one end portion of a spring secured in a mounting between two leading or trailing wheels, the buffers on the mountings of the wheels both pushing against the same arm, the abutments for the mountings of the other pair of wheels being end portions of a spring arm pivotted between the wheels so that the buffers carried by the mountings of those wheels push against the same arm.

6. A vehicle according to claim 1, the arm in each case being made up of two leaf springs one above the other.

7. A vehicle according to claim 1, said means comprising pneumatic spring units controlling motion of said arms.

8. A vehicle according to claim 1 having a square chassis to the underside of which there are mounted at four symmetrical positions between the corners the anchorages for the arms, the chassis carrying beneath it at the mid point a ground probing radar antenna assembly which is symmetrical about a normal through the mid point.

* * * * *